United States Patent [19]

Butters

[11] Patent Number: 5,296,292
[45] Date of Patent: Mar. 22, 1994

[54] ELONGATED CYLINDRICAL TENSILE ARTICLE

[75] Inventor: Leslie C. Butters, Flagstaff, Ariz.

[73] Assignee: W. L. Gore & Associates, Inc., Newark, Del.

[21] Appl. No.: 576,867

[22] Filed: Sep. 4, 1990

[51] Int. Cl.$^5$ ............................................. D02G 3/00
[52] U.S. Cl. ................................ 428/375; 428/373; 428/378; 428/394; 428/398; 428/399; 428/377; 43/44.98; 57/204; 87/3
[58] Field of Search ............... 428/378, 373, 383, 375, 428/394, 395, 392, 367, 332, 340, 398, 399; 43/44.98; 57/204; 87/3, 8, 9

[56] References Cited

U.S. PATENT DOCUMENTS

| | | | |
|---|---|---|---|
| 3,814,015 | 10/1974 | Gregory | 43/44.98 |
| 3,830,009 | 8/1974 | Collingbourne | 43/44.98 |
| 3,962,153 | 6/1976 | Gore | 428/398 |
| 4,030,741 | 6/1977 | Fidrych | 285/161 |
| 4,163,825 | 8/1979 | Wimmer | 428/394 |
| 4,187,390 | 2/1980 | Gore | 428/364 |
| 4,321,854 | 3/1982 | Foote et al. | 43/44.98 |
| 4,386,132 | 5/1983 | Dille et al. | 428/394 |
| 4,521,483 | 6/1985 | Sasaki et al. | 428/373 |
| 4,529,564 | 11/1983 | Harlow | 264/127 |
| 4,550,738 | 11/1985 | Nakanishi et al. | 43/44.98 |
| 4,629,654 | 12/1986 | Sasaki et al. | 428/394 |
| 4,711,811 | 12/1987 | Randa | 428/375 |
| 4,826,725 | 8/1987 | Harlow | 428/375 |
| 4,877,661 | 10/1989 | House et al. | 428/398 |
| 4,997,689 | 3/1991 | Langen et al. | 428/34.9 |
| 5,061,561 | 10/1991 | Katayama | 428/398 |

FOREIGN PATENT DOCUMENTS

| | | | |
|---|---|---|---|
| 0106496 | 4/1984 | European Pat. Off. | |
| 352749 | 1/1990 | European Pat. Off. | 428/398 |
| 2276019 | 11/1987 | Japan | 43/44.98 |
| 312535 | 12/1990 | Japan | 43/44.98 |
| 8400717 | 3/1984 | PCT Int'l Appl. | |
| 8800521 | 1/1988 | PCT Int'l Appl. | |
| 1211963 | 11/1970 | United Kingdom | |
| 218031 | 3/1987 | United Kingdom | 43/44.98 |
| 2192522 | 1/1988 | United Kingdom | |

OTHER PUBLICATIONS

Patent abstracts of Japan, vol. 13, No. 330 and JP 1095421A.

*Primary Examiner*—Patrick J. Ryan
*Assistant Examiner*—J. M. Gray
*Attorney, Agent, or Firm*—Wayne D. House

[57] ABSTRACT

An elongated cylindrical tensile article of one or more strands of monofilament core surrounded by porous polytetrafluoroethylene (PTFE) which may be optionally coated or die sized on the outer surface for smoothness and/or abrasion resistance. The core filaments thereof may optionally be coated with high-temperature resistant adhesive for increased adherence to the PTFE. The article is particularly useful for fly-casting lines for fishing. The density may be controlled to produce a floating or sinking flyline or portion thereof.

17 Claims, 3 Drawing Sheets

ELONGATED CYLINDRICAL TENSILE ARTICLE

FIELD OF THE INVENTION

The present invention relates to elongated cylindrical tensile articles having tensile strength members as a core surrounded by a polymer sheath, and more particularly to such articles useful as fly fishing lines.

BACKGROUND OF THE INVENTION

Elongated cylindrical tensile articles of the type useful as flylines, are usually manufactured from a polymeric monofilament, a single or multistrand polymer filament core surrounded by a usually extruded polymer covering such as polyvinyl chloride, or a braided polymer or glass filament. The overall density of the line determines whether or not the line floats on the surface of water or sinks in water.

The flyline itself may be of a sinking or floating type or may be a generally floating line with a sinking tip or may be level (having no taper) or tapered in various segments of its length to achieve weight distributions deemed favorable for more accurate placement of a fly or for easier placement of the fly at a longer distance from the angler. Fly fishing lines are usually up to about 105 feet in length. This length is typically secured to a length of small diameter backing line which is first wound onto the reel ahead of the flyline to give extra length as necessary for casting the flyline or playing a hooked fish.

To provide a floating line, one method used at the present time is to surround a core by a polymer layer containing as filler a quantity of hollow light-weight microspheres or microballoons of about 50 to 250 micron diameter. These microballons are available in various diameters, compositions, and densities and are typically of plastic or glass composition. Such microballoons may be prepared by methods disclosed in U.S. Pat. No. 2,797,201, for instance. An additional layer of polymer containing no filler, or a lesser quantity of microballoon filler, may surround the inner or first layer to provide a smoother more durable skin on the line and to give a less stiff or more flexible line.

In contrast, a sinking line may contain components of density greater than one or contain a heavy filler to achieve that higher density.

Other descriptions of presently available fly-casting lines and their methods of manufacture may be found described in U.S. Pat. Nos. 3,841,015; 3,868,785 and 4,524,540, an article by Mosser in "Fly Fishing," June 1989, pages 85-87, and an additional article in "Fly Fisherman," Dec 1989, pages 38-43, 60-61.

SUMMARY OF THE INVENTION

The invention comprises an elongated cylindrical tensile article having as an axially-oriented core a strength member comprising one or more strands of monofilament, and having a layer of porous polytetrafluoroethylene (PTFE) surrounding the core. By strength member is meant a member that strengthens or reinforces the article.

The porous PTFE is preferably porous expanded PTFE having a microstructure of nodes interconnected by fibrils produced according to U.S. Pat. Nos. 3,953,566 and 4,187,390. It is believed that many prior art processes specific to producing porous, flexible PTFE articles can be used in conjunction with the present invention, including processes where stretching is accomplished in the presence of a lubricant. The PTFE surrounding the core is preferably applied by extrusion. One or more of the monofilament fibers may optionally be coated with an adhesive layer which will withstand and function effectively at temperatures used during manufacture of the article. The PTFE layer may be rendered abrasion resistant by sizing the article through a die to smooth and toughen its surface or by coating it with an abrasion resistant material. The article has properties of high tensile strength, suppleness, suitable density, hydrophobicity, soil resistance, abrasion resistance, and low surface friction that render it an excellent material for use as a fly-casting line for fishing. The article may be manufactured to easily float on water, alternatively sink into water, or have portions which are of differing density which will cause a section of the article to float and another section to sink. Tapered sections of different outside diameters may be incorporated into the article. By taper is meant a gradually changing diameter or thickness along the line. The article can be made in almost any color including white.

The article of the present invention may also be useful for ropes, etc., where a tensile article having a very low friction surface is desired, in hostile chemical environments where the highly inert PTFE covering layer offers an advantage, or in high temperature environments.

DETAILED DESCRIPTION OF THE INVENTION

The invention will now be described with reference to the drawings to more clearly delineate the invention and the materials useful therein. A process for manufacture of the articles of the invention will also be described.

Figure 1:
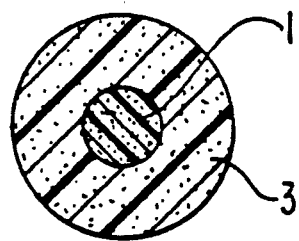
FIG. 1 shows a cross-sectional view of the article of the invention.

FIG. 1 shows a cross-sectional view of an article of the invention wherein an axially-oriented core 1 is surrounded by a layer 3 of porous expanded PTFE. The core 1 is a tensile strength member which is preferably comprised of porous expanded PTFE but may also be comprised of other materials such as glass or carbon fibers, polycarbonate, polysulfone, polyphenol, polyamide, polyimide, polyamide imide or other useful materials which are strong and concurrently high temperature resistant so that they can withstand the temperatures used in the manufacturing processes of the invention. The core 1 may consist essentially of one or more strands of monofilament, a monofilament being defined as a single filament. Multiple strands may be braided or twisted together or form core 1. The surrounding layer 3 of PTFE is preferably extruded around the core 1. Other methods of applying the surrounding PTFE may be used such as, for example, by tape-wrapping.

PTFE layer 3 is most often manufactured to have a low density to give an article having an overall density of less than about 1.00 g/cc, such as the range 0.50 to 1.00 g/cc, so that the article will float on water when cast as a fly fishing line onto the surface of water. The overall density of an article may be manufactured to be above 1.00 g/cc, however, so as to provide a fly fishing line which will sink for certain types of deeper water fishing where experience has shown sinking lines to be effective.

The density of non-porous PTFE that has been previously raised above its crystalline melt temperature is generally considered to be about 2.2 g/cc.

Figure 2:
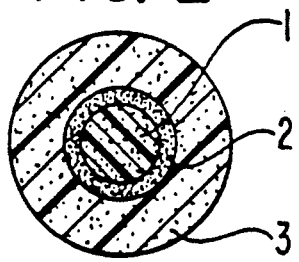
FIG. 2 shows a cross-sectional view of an embodiment wherein an adhesive is used to bond the core to the covering PTFE layer.

FIG. 2 describes a cross-sectional view of a preferred embodiment of the present invention wherein core 1 is coated with an adhesive layer 2 of a suitable adhesive material. The adhesive material must withstand and effectively retain its adhesive properties at the temperatures required by the processes of manufacture of the article.

Figure 3:
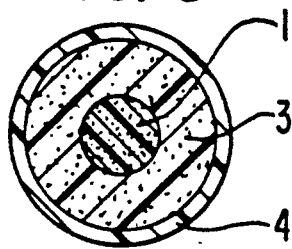
FIG. 3 shows a cross-sectional view of an embodiment wherein the PTFE surface layer has been modified by either the addition of a coating of abrasion resistant material or by densifying the surface of the expanded PTFE layer to increase abrasion resistance.

As shown by FIG. 3, the surface of the porous expanded PTFE layer 3 may be modified by the addition of a coating 4 of high abrasion resistant material, such as PFA or other like fluoropolymer or other materials which are strong and abrasion resistant so that the article will pass through the line guides of a fishing rod with minimum friction and wear on both guides and line. Alternatively, the surface of the PTFE layer may be modified after being applied over the core member by pulling the line through a sizing die, which may optionally be heated. Such a process increases the density of the PTFE surface relative to the remainder of the PTFE layer, producing an outer surface 4 having increased abrasion resistance. This density gradient is visually apparent in photomicrographs of cross sections of the inventive article. A sizing die of variable orifice diameter may be used to produce a tapered line.

Figure 4:
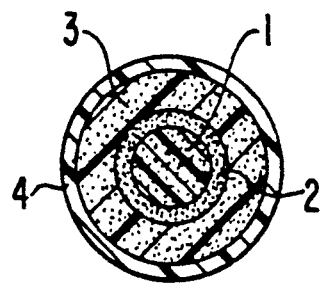
FIG. 4 shows a cross-sectional view of an embodiment incorporating both an adhesive layer between the core and covering layer of expanded PTFE, and a modified outer surface on the covering layer of expanded PTFE.

FIG. 4 describes an embodiment of the present invention wherein an adhesive layer is used to bond the core material to the PTFE layer, which layer in turn has a modified outer surface 4 as previously described.

Figure 5:
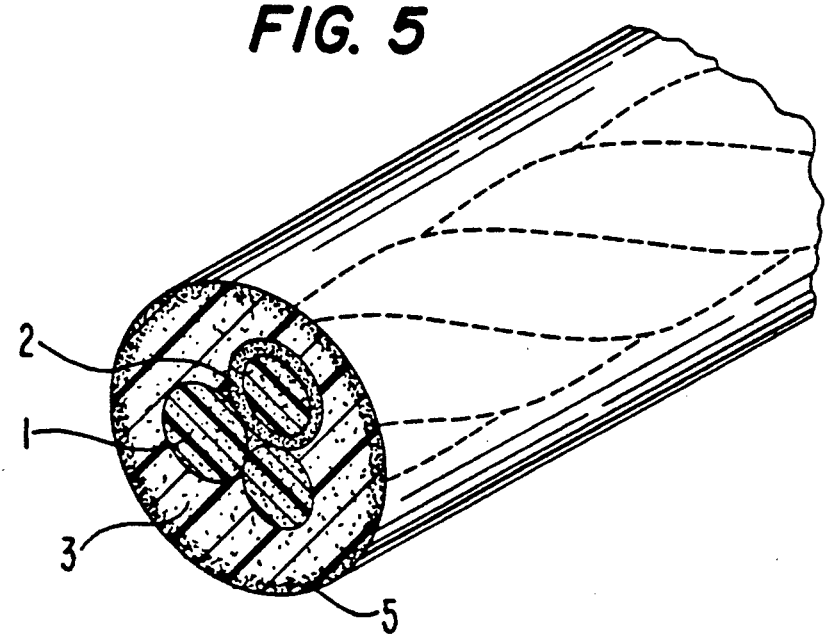
FIG. 5 describes a perspective cross-sectional view of the article of the invention with the hidden strength members shown dotted.

A multistrand core version of an article of the invention is described in FIG. 5, where, for example, three monofilament strands 1 comprise the core, one of which strands is depicted as coated with an adhesive layer 2. The core is surrounded by an expanded PTFE layer 3. All of strands 1 may be coated with adhesive layer 2 to cause the core to be even more strongly adhered to the PTFE layer 2. An exterior region 5 of the surface of PTFE layer 3 is shown as smoothed and toughened by passing the article through a sizing die.

Figure 6:
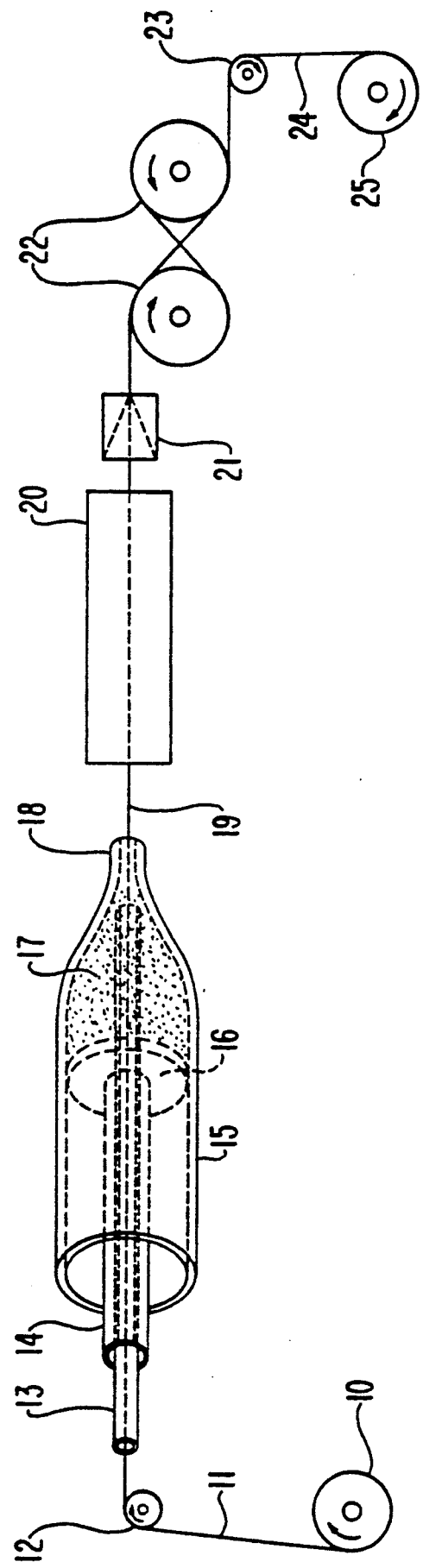
FIG. 6 depicts a schematic view of a process of manufacture of the article of the invention.

A schematic drawing of a process for manufacture of articles of the invention is depicted in FIG. 6. A reel 10 of monofilament or multifilament twisted, woven or braided strands of core material 11 feeds core 11 over roller 12 into a hollow guide tube 13 which feeds core 11 into the center of a ram extruder 15, which has a ram 14 with piston 16 fitting within it. Particles of extrusion grade PTFE mixed with a hydrocarbon extrusion aid or lubricant in a manner well known in the art into an extrusion paste and compressed into a pre-form 17 is placed into extruder 15 in front of piston 16. During extrusion of preform 17 through extrusion die 18 by piston 16 driven by mechanical means (not shown in diagram), core 11 is surrounded by a PTFE layer to give coated core 19. The rate of extrusion can be determined from the ram speed or by other methods known in the art. Coated core 19 passes into heated oven 20 where the lubricant or extrusion aid is vaporized and removed from coated core 19, the PTFE layer 3 of which expands without changing essentially in cross-sectional dimensions to become much more porous. The porous expanded PTFE is also sintered within oven 20 as it reaches temperatures in excess of the crystalline melt temperature, as high as about 400° C., for instance.

Coated core 19 passes from oven 20 optionally through a sizing die 21 which may be heated. The die contacts and compresses the surface slightly to render it smooth and to increase abrasion resistance. The die may be also used to affect the diameter and density of the finished line. A pull-through capstan 22, depicted as a pair of reels over which coated core 19 is wound several turns, draws core material 11 from reel 10 through extruder 15 at a rate which is controllably linked with the extrusion rate by known means to give a controlled capstan speed which can be adjusted to provide the desired speed differential between the extruded PTFE coating of coated core 19 and the final product article 24. The capstan pulls the core material 11 through the system at a rate such that the expanded PTFE coating reaches an equal speed to that of core 11 as, or immediately after, sintering occurs within oven 20. After optionally being sized and finished by die 21, the final product article 24 then passes over guide roll 23 and is taken up on finished product reel 25.

Articles of the invention may be prepared having different densities, either less or more than 1.00 g/cc by varying the amount of expansion of the PTFE material along the length of the article, or by varying the diameter with the use of a sizing die. The PTFE layer is expanded such that its final length is about 1.5 times to about 6 times the extruded length. This can be measured by placing two marks on the article immediately after extrusion, measuring the distance between them and comparing that distance to the measured distance between the marks after completion of expansion. Such an article has appropriate densities for use as fly-casting lines for fishing. For a floating fly-casting line, a density of about 0.50 to about 0.96 g/cc is preferred, although a line of density 1.00 g/cc will often float on water owing to the surface tension of the water. Articles can also be produced having varying densities within the overall length of the finished article for purposes of varying floatation characteristics along the length.

Multiple strands of filament core material are preferred in that these tend to provide increased suppleness and adhere better to the covering expanded PTFE and optional high-temperature resistant thermopolymer adhesive.

The present invention provides a product which can be cast longer distances by a fly rod in that it provides a line of very low coefficient of friction, hence less resistance to movement through guides of a fly rod, can be high floating, can be made in numerous colors, is properly supple without sagging or drooping between guides of a fly rod, and is hydrophobic, thus giving less splash on pick up from a water surface and picks up less water from the surface when it rises therefrom. A flyline made from an article of the invention has very little memory and consequently very little reel set as compared to, for example, typical flylines manufactured from polyvinyl chloride polymer.

Heavy fillers could be used in portions of an article of the invention to aid in providing a higher density than 1.00 g/cc to that portion of the article, but it is preferred to increase density by lowering the expansion ratio of the extruded PTFE over that portion of the article.

It will be obvious to those skilled in the art that materials and processes may be used in the invention equivalent to those exemplified and these are also regarded as residing within the invention and within the scope of the appended claims.

EXAMPLE

A GORE-TEX® expanded PTFE fiber (W. L. Gore & Associates, Elkton, Md.) comprising a twisted pair of 600 denier monofilaments was selected as the core strength member for a flyline. This PTFE fiber was given a coating of about 0.0007 inch thickness PFA resin by hot melt extrusion. The PFA coating was intended as an adhesive to bond the subsequent applied outer layer of expanded PTFE.

CD123 fine powder PTFE resin (obtained from ICI Americas) was blended with 150 cc of Isopar M odorless solvent (obtained from Exxon Corporation), per pound of PTFE resin. The lubricated resin was compressed into a tubular preform of about 0.850 inch diameter and 16 inches in length. The preform was placed into the barrel of a ram extruder having an extrusion die of 0.070 inch orifice diameter. The extruder incorporated a guide tube of 0.028 inch O.D. and 0.021 inch I.D. The extruder barrel was heated to 60° C. and a PTFE covering layer was extruded at a rate of 3 feet per minute onto the expanded PTFE core material as the core material was pulled through the guide tube of the extruder at a rate of 9 feet per minute. The extruded PTFE covered core was of about 0.065 inch diameter before entering the oven.

The product of this extrusion process continued into a convection oven about five feet in length to accomplish removal of the solvent by vaporization, expansion of the PTFE by stretching and finally sintering of the PTFE. The oven temperature at the product entrance end was set at about 204° C. and at the exit end at about 404° C. The linear speed difference between the core member as pulled by the capstan, and the extruded covering, resulted in stretching and expansion of the extruded covering of PTFE within the oven.

The coated, expanded and sintered line was of about 0.065 inch diameter before sizing. After exiting the oven, the product was pulled through a sizing die of about 0.061 inch inside diameter, continuing at the same rate of 9 feet per minute. The die was heated, having a temperature set point of about 388° C. The die was made in two halves, being split longitudinally, that is, split parallel to the longitudinal axis of the die along a diameter of the die orifice. A clamping force was used to hold the two halves of the die together in such a manner that, by controllably relieving the clamping force, the two halves of the die were allowed to separate so that a product of increased diameter resulted. With the die halves closed tightly together, the product exiting the die was a flyline having a coating of expanded PTFE of about 0.051 inch diameter and an overall density of about 0.90 g/cc. By gradually releasing the force holding the die halves together, a taper was made into the flyline with the outside diameter increased to about 0.065 inches at a linear distance of about ten feet from the 0.051 inch diameter section. The 0.065 inch diameter section had an overall density of about 0.55 g/cc. It is apparent that the use of different die conditions can result in flylines of different diameters, densities, handling characteristics and surface finishes.

The break strength of samples of the finished flyline made for this example was tested on an Instron model 1122 against samples of the core material alone, that is, without the added expanded PTFE covering. Using tire cord grips with a grip separation length of 6 inches and a pull rate of 7.9 in/min (200 mm/min), three samples of the core material broke at a mean value of 17.1 lbs. Three samples of the finished flyline of this example broke at a mean value of 25.0 lbs. None of the samples tested broke at the edge of the grips. It appears that the covering layer of expanded PTFE added substantially to the break strength of the flyline.

I claim:

1. A fly fishing line comprising:
   (a) a non-metallic tensile strength member core comprising at least one monofilament; and
   (b) a layer of porous polytetrafluoroethylene surrounding said tensile strength member;
   wherein at least a portion of the length of the layer of porous polytetrafluoroethylene is tapered.

2. The fly fishing line of claim 1 wherein said porous polytetrafluoroethylene has a microstructure of nodes interconnected by fibrils.

3. The fly fishing line of claims 1 or 2 wherein said porous polytetrafluoroethylene layer has an abrasion resistant outer surface layer.

4. The fly fishing line of claims 1 or 2 wherein said porous polytetrafluoroethylene layer has a densified outer surface.

5. The fly fishing line of claims 1 or 2 comprising at least two monofilaments that are twisted, woven or braided together.

6. The fly fishing line of claims 1 or 2 wherein said fly fishing line has an overall density of from about 0.50 to about 1.00 g/cc.

7. The fly fishing line of claims 1 or 2 wherein said fly fishing line has an overall density of greater than about 1.00 g/cc.

8. The fly fishing line of claims 1 or 2 wherein a first length portion of said fly fishing line has a density from about 0.50 to about 1.00 g/cc and a second length portion of said article has a density greater than about 1.00 g/cc.

9. The fly fishing of claims 1 or 2 wherein said porous polytetrafluoroethylene contains a coloring pigment.

10. The fly fishing of claims 1 or 2 wherein at least one monofilament of said strength member core is coated with an adhesive layer.

11. The fly fishing line of claim 10 wherein said adhesive layer comprises PFA copolymers.

12. The fly fishing of claims 1 or 2 wherein at least one monofilament of said strength member core comprises an adhesive.

13. The fly fishing of claim 12 wherein said adhesive comprises a thermoplastic polymer.

14. The fly fishing of claim 13 wherein said adhesive comprises PFA copolymers.

15. The fly fishing line of claims 1 or 2 wherein said strength member core comprises at least two monofilaments that are surrounded as a unit by an adhesive layer.

16. The fly fishing of claim 15 wherein said adhesive layer comprises PFA copolymers.

17. The fly fishing line of claims 1 or 2 wherein said strands of said strength member are selected from the group consisting of polytetrafluoroethylene, carbon, glass, and polycarbonate, polysulfone, polyphenol, polyamide, polyimide, and polyamide imide polymers.

* * * * *